United States Patent Office 3,497,595
Patented Feb. 24, 1970

3,497,595
TRIAZOLYLAMINO HALOGENATED FURANONES TO CONTROL BACTERIA
Joseph W. Baker and Gerald L. Bachman, Kirkwood, Mo., assignors to Monsanto Company, St. Louis, Mo., a corporation of Delaware
No Drawing. Filed June 16, 1967, Ser. No. 646,445
Int. Cl. A01n 9/22
U.S. Cl. 424—269
9 Claims

ABSTRACT OF THE DISCLOSURE

This disclosure covers the use of triazolylamino halogenated furanones to control the growth of bacteria.

---

This invention relates to the use of certain chemical compounds in the control of bacterial growth. More particularly, this invention relates to the use of triazolylamino halogenated furanones for such a purpose.

The compounds which are employed in accordance with this invention are identified as 2-(3-triazolylamino)-3,4-dihalofuran-5-ones. The halogen atoms on the furanone ring are either chlorine or bromine. These compounds can be prepared by reacting either mucobromic acid or mucochloric acid with the appropriate aminotriazole. Preferably, each of the reactants is first dissolved in an inert solvent. The following preparations are given by way of more specific illustration.

Example

A solution of 5.2 grams (0.02 mole) of mucobromic acid in 100 ml. of methanol is first prepared. Then a solution of 1.7 grams (0.02 mole) of 3-amino-1H-1,2,4-triazole in 100 ml. of methanol is added and the mixture is stirred at reflux temperature for about one hour. The methanol solvent is evaporated to about 20 ml. A solid precipitate is then removed by filtration to yield 2.0 grams of 2-(3-triazolylamino)-3,4-dibromofuran-5-one as a light yellow solid which melts at 175° C. with decomposition.

When 3.4 grams (0.02 mole) of mucochloric acid is substituted for the mucobromic acid in the above procedure, there is obtained 2.0 grams of 2-(3-triazolylamino)-3,4-dichlorofuran-5-one as an off-white solid melting at 170° C. with decomposition. This compound and its preparation are described in German Patent No. 1,187,850. Utility as a herbicide is asserted.

As pointed out above, the compounds of this invention have been found to possess useful and unexpected microbiological activity. In this regard, such compounds have been found to be particularly effective in the control of both gram positive and gram negative bacteria. To demonstrate the aforesaid control, the following test procedure was employed. Stock solutions were prepared by dissolving 100 mg. of the compound to be tested in 10 ml. of acetone, alcohol, or other solvents. These stock solutions are serially diluted by pipetting 2 ml. of the stock solution into 18 ml. of sterile nutrient agar to obtain a $1 \times 10^3$ dilution and continuing this procedure in the same manner to obtain further dilutions up to $1 \times 10^6$. The agar was poured into Petri dishes, allowed to harden, and was then spot inoculated with one drop of a cell suspension of the bacteria to be controlled. The suspensions was prepared by suspending the growth from a 24 hour nutrient agar slant culture in 10 ml. of distilled water. The inoculated samples were incubated at 37° C. for 48 hours and were thereafter examined to determine whether or not bacterial growth had occurred.

The above test was conducted with each of the compounds of this invention. It was found that there was no growth of *Staphylococcus aureus*, a representative gram positive bacteria, at a dilution at at least one part per one million parts of diluent. Each of the compounds of this invention were also found to control the growth of *Salmonella typhosa*, a representative gram negative bacteria, at at least the same dilution. Further, both compounds were found to control the growth of *Pseudomonas aeruginosa*, another representative gram negative bacteria, at a dilution of at least one part per ten thousand parts of diluent. Similar results are obtained with other and different bacteria of the types represented above.

What is claimed is:
1. A method for controlling the growth of bacteria by contacting said bacteria with an effective amount of a 2-(3-triazolylamino)-3,4-dihalofuran-5-one wherein the halogen is selected from the group consisting of chlorine and bromine.
2. A method as defined in claim 1 wherein the halogen is chlorine.
3. A method as defined in claim 1 wherein the halogen is bromine.
4. A method as defined in claim 1 wherein the bacteria is gram positive bacteria.
5. A method as defined in claim 4 wherein the halogen is chlorine.
6. A method as defined in claim 4 wherein the halogen is bromine.
7. A method as defined in claim 1 wherein the bacteria is gram negative bacteria.
8. A metohd as defined in claim 7 wherein the halogen is chlorine.
9. A method as defined in claim 7 wherein the halogen is bromine.

References Cited

FOREIGN PATENTS
1,187,850   2/1965   Germany.

ALBERT T. MEYERS, Primary Examiner

D. M. STEPHEN, Assistant Examiner

U.S. Cl. X.R.
424—285